(12) United States Patent
Anderson et al.

(10) Patent No.: US 6,846,407 B2
(45) Date of Patent: Jan. 25, 2005

(54) METHOD AND APPARATUS FOR RECOVERY OF WASTE WATER

(75) Inventors: Harold Randoph Anderson, Clermont, FL (US); Jeffrey Stuart Lebedin, Marietta, GA (US)

(73) Assignee: EMI, LLC, Marietta, GA (US)

( * ) Notice: Subject to any disclaimer, the term of this patent is extended or adjusted under 35 U.S.C. 154(b) by 134 days.

(21) Appl. No.: 10/020,653

(22) Filed: Oct. 30, 2001

(65) Prior Publication Data

US 2002/0179514 A1 Dec. 5, 2002

Related U.S. Application Data (60) Provisional application No. 60/286,699, filed on Apr. 26, 2001.

(51) Int. Cl.$^7$ ............... C02F 9/02; C02F 9/12; C02F 9/04; C02F 1/56; C02F 1/28
(52) U.S. Cl. ............... 210/167; 210/258; 210/665; 210/666; 210/669; 210/266; 210/760; 210/744; 210/97; 210/764; 210/806; 210/195.1; 210/206
(58) Field of Search ............... 210/805, 806, 210/195.1, 206, 258, 167, 665, 666, 669, 266, 760, 744, 97

(56) References Cited

U.S. PATENT DOCUMENTS

| | | | |
|---|---|---|---|
| 3,738,126 A | * 6/1973 | Smith | 210/355 |
| 4,104,164 A | 8/1978 | Chelton | 210/136 |
| 4,211,652 A | * 7/1980 | Thomas | |
| 5,181,399 A | 1/1993 | Engel | 68/13 |
| 5,246,590 A | * 9/1993 | Dobrez et al. | 210/705 |
| 5,254,246 A | 10/1993 | Rivelli | 210/195.4 |
| 5,350,526 A | * 9/1994 | Sharkey et al. | 210/791 |
| 5,403,498 A | 4/1995 | Morrissey | 210/767 |
| 5,493,743 A | 2/1996 | Schneider et al. | |
| 5,512,178 A | 4/1996 | Dempo | |
| 5,647,977 A | * 7/1997 | Arnaud | 210/167 |
| 5,787,537 A | 8/1998 | Mannillo | 8/158 |
| 5,807,487 A | * 9/1998 | Lahti | 210/665 |
| 5,885,459 A | * 3/1999 | Lerche et al. | 210/602 |
| 6,010,621 A | * 1/2000 | Pattee | 210/114 |
| 6,029,479 A | 2/2000 | Pattee | |
| 6,299,779 B1 | 10/2001 | Pattee | 210/694 |

FOREIGN PATENT DOCUMENTS

| | | | | |
|---|---|---|---|---|
| DE | 196 30 089 C 1 | 10/1997 | | |
| EP | 578006 A1 | * 1/1994 | | D06F/39/00 |

* cited by examiner

Primary Examiner—Thomas M. Lithgow
(74) Attorney, Agent, or Firm—Jason A. Bernstein; Powell, Goldstein, Frazer & Murphy LLP (57) ABSTRACT

An apparatus and method for recovering wastewater from laundry operations. A substantially closed loop series of tanks, conduits and pumps hold and transfer water output from a wash machine through a series of filters, including a lint pulloff filter, a multimedia pressure filter, a clay filter, and a carbon filter. The water is ozonated to coagulate suspended solids and to disinfect and is subjected to ultraviolet light to disinfect and to reduce residual ozone.

12 Claims, 6 Drawing Sheets

| DATE | TIME | RECYCLE READING | CITY WATER READING | RECYCLE | CITY | TOTAL WATER | RECYCLE % | GAS SAVINGS | WATER SAVINGS | SEWER SAVINGS | TOTAL SAVINGS |
|---|---|---|---|---|---|---|---|---|---|---|---|
| 3/9/01 | 10:35 | 744,210 | 79,495 | | | | | | | | |
| 3/10/01 | 7:35 | 804,068 | 79,512 | 59,858 | 17,000 | 76,858 | 78% | | | | |
| 3/11/01 | 10:00 | 882,344 | 79,531 | 78,276 | 19,000 | 97,276 | 80% | | | | |
| 3/12/01 | 9:00 | 932,043 | 79,541 | 49,699 | 10,000 | 59,699 | 83% | | | | |
| 3/13/01 | 10:40 | 1,056,152 | 79,580 | 124,109 | 39,000 | 163,109 | 76% | | | | |
| 3/14/01 | 6:30 | 1,131,312 | 79,598 | 75,160 | 18,000 | 93,160 | 81% | | | | |
| 3/16/01 | 7:55 | 1,280,903 | 79,649 | 149,591 | 51,000 | 200,591 | 75% | | | | |
| 3/17/01 | 12:10 | 1,333,426 | 79,659 | 52,523 | 10,000 | 62,523 | 84% | | | | |
| 3/19/01 | 9:45 | 1,398,600 | 79,719 | 65,174 | 60,000 | 125,174 | 52% | | | | |
| 3/20/01 | 9:40 | 1,469,832 | 79,747 | 71,232 | 28,000 | 99,232 | 72% | | | | |
| 3/21/01 | 1:20 | 1,554,050 | 79,788 | 84,218 | 41,000 | 125,218 | 67% | | | | |
| 3/22/01 | 10:00 | 1,592,103 | 79,830 | 38,053 | 42,000 | 80,053 | 48% | | | | |
| 3/23/01 | 7:30 | 1,730,017 | 79,846 | 137,914 | 16,000 | 153,914 | 90% | | | | |
| 3/25/01 | 8:00 | 1,821,902 | 79,863 | 91,885 | 17,000 | 108,885 | 84% | | | | |
| 3/26/01 | 12:00 | 1,904,725 | 79,885 | 82,823 | 22,000 | 104,823 | 79% | | | | |
| 3/27/01 | 12:20 | 1,978,874 | 79,900 | 74,149 | 15,000 | 89,149 | 83% | | | | |
| 3/28/01 | 5:00 | 2,105,824 | 79,923 | 126,950 | 23,000 | 149,950 | 85% | | | | |
| 3/29/01 | 12:55 | 2,165,167 | 79,935 | 59,343 | 12,000 | 71,343 | 83% | | | | |
| 3/30/01 | 10:25 | 2,244,604 | 79,946 | 79,437 | 11,000 | 90,437 | 88% | | | | |
| 3/31/01 | 3:15 | 2,350,690 | 79,962 | 106,086 | 16,000 | 122,086 | 87% | | | | |
| | | | | 1,606,480 | 467,000 | 2,073,480 | 77% | $4,771.71 | $3,180.83 | $4,787.31 | $12,739.85 |
| 4/1/01 | 1:40 | 2,403,020 | 79,972 | 52,330 | 10,000 | 62,330 | 84% | | | | |
| 4/2/01 | 5:16 | 2,481,925 | 79,985 | 78,905 | 13,000 | 91,905 | 86% | | | | |
| 4/3/01 | 11:45 | 2,518,343 | 79,995 | 36,418 | 10,000 | 46,418 | 78% | | | | |
| 4/4/01 | 10:50 | 2,637,041 | 80,016 | 118,698 | 21,000 | 139,698 | 85% | | | | |
| 4/6/01 | 3:30 | 2,788,855 | 80,044 | 151,814 | 28,000 | 179,814 | 84% | | | | |
| 4/7/01 | 3:30 | 2,921,025 | 80,067 | 132,170 | 23,000 | 155,170 | 85% | | | | |
| 4/11/01 | 11:30 | 3,133,431 | 80,106 | 212,406 | 39,000 | 251,406 | 84% | | | | |
| 4/14/01 | 1:00 | 3,387,200 | 80,149 | 253,769 | 43,000 | 296,769 | 86% | | | | |
| 4/16/01 | 10:45 | 3,493,271 | 80,169 | 106,071 | 20,000 | 126,071 | 84% | | | | |
| 4/18/01 | 4:30 | 3,522,238 | 80,360 | 28,967 | 191,000 | 219,967 | 13% | | | | |
| 4/19/01 | 5:10 | 3,593,401 | 80,387 | 71,163 | 27,000 | 98,163 | 72% | | | | |
| 4/21/01 | 10:10 | 3,708,547 | 80,469 | 115,146 | 82,000 | 197,146 | 58% | | | | |

FIG. 5B

| | | | | | | | | | | |
|---|---|---|---|---|---|---|---|---|---|---|
| 4/22/01 | 9:10 | 3,745,030 | 80,523 | 36,483 | 54,000 | 90,483 | 40% | lint shaker down - double level | | | |
| 4/23/01 | 5:00 | 3,745,030 | 80,663 | - | 140,000 | 140,000 | 0% | | | | |
| 4/24/01 | 3:45 | 3,792,788 | 80,697 | 47,758 | 34,000 | 81,758 | 58% | | | | |
| 4/25/01 | 10:45 | 3,856,280 | 80,708 | 63,492 | 11,000 | 74,492 | 85% | | | | |
| 4/26/01 | 10:00 | 3,929,707 | 80,723 | 73,427 | 15,000 | 88,427 | 83% | | | | |
| 4/28/01 | 2:30 | 4,119,557 | 80,766 | 189,850 | 43,000 | 232,850 | 82% | | | | |
| | | | | 1,768,867 | 804,000 | 2,572,867 | 69% | $5,924.63 | $3,502.36 | $5,271.22 | $14,698.21 |
| | | | | | | | | | | | |
| 5/2/01 | 9:45 | 4,405,452 | 80,820 | 285,895 | 54,000 | 339,895 | 84% | | | | |
| 5/3/01 | 1:00 | 4,524,711 | 80,847 | 119,259 | 27,000 | 146,259 | 82% | | | | |
| 5/5/01 | 1:30 | 4,692,882 | 80,877 | 168,171 | 30,000 | 198,171 | 85% | | | | |
| 5/6/01 | 10:00 | 4,735,555 | 80,882 | 42,673 | 5,000 | 47,673 | 90% | | | | |
| 5/7/01 | 2:00 | 4,798,101 | 80,915 | 62,546 | 33,000 | 95,546 | 65% | left carbon valves open | | | |
| 5/8/01 | 10:30 | 4,862,499 | 80,927 | 64,398 | 12,000 | 76,398 | 84% | | | | |
| 5/9/01 | 8:45 | 4,895,019 | 80,983 | 32,520 | 56,000 | 88,520 | 37% | put feed pump in manual | | | |
| 5/10/01 | 2:30 | 5,013,253 | 81,007 | 118,234 | 24,000 | 142,234 | 83% | | | | |
| 5/11/01 | 4:00 | 5,115,813 | 81,025 | 102,560 | 18,000 | 120,560 | 85% | | | | |
| 5/27/01 | 10:00 | 5,907,781 | 81,586 | 791,968 | 561,000 | 1,352,968 | 59% | | | | |
| 5/28/01 | 1:00 | 5,979,958 | 81,609 | 72,177 | 23,000 | 95,177 | 76% | | | | |
| 5/30/01 | 11:00 | 6,102,573 | 81,654 | 122,615 | 45,000 | 167,615 | 73% | | | | |
| 5/31/01 | | 6,210,380 | 81,684 | 107,807 | 30,000 | 137,807 | 78% | | | | |
| | | | | 2,090,823 | 918,000 | 3,008,823 | 69% | $6,925.83 | $4,139.83 | $6,230.65 | $17,296.31 |
| | | | | | | | | | | | |
| 6/3/01 | | 6,340,235 | 81,752 | 129,855 | 68,000 | 197,855 | 66% | | | | |
| 6/5/01 | | 6,501,000 | 81,793 | 160,765 | 41,000 | 201,765 | 80% | | | | |
| 6/6/01 | | 6,563,456 | 81,830 | 62,456 | 37,000 | 99,456 | 63% | | | | |
| 6/7/01 | 8:30 | 6,596,431 | 81,845 | 32,975 | 15,000 | 47,975 | 69% | | | | |
| 6/25/01 | | 7,571,376 | 82,602 | 974,945 | 757,000 | 1,731,945 | 56% | added third carbon tank | | | |
| | | | | 1,360,996 | 918,000 | 2,278,996 | 60% | $5,245.80 | $2,694.77 | $4,055.77 | $11,996.34 |
| | | | | | | | | | | | |
| 7/5/01 | 1:30 | 7,936,746 | 83,059 | 365,370 | 457,000 | 822,370 | 44% | chemical polymer testing | | | |
| 7/18/01 | 4:30 | 8,614,784 | 83,571 | 678,038 | 512,000 | 1,190,038 | 57% | lint screen broke | | | |

FIG. 5C

| | | | | | | | | | | |
|---|---|---|---|---|---|---|---|---|---|---|
| 7/22/01 | 3:00 | 8,667,164 | 83,587 | 52,380 | 16,000 | 68,380 | 77% | | | |
| 7/23/01 | 12:30 | 8,877,512 | 83,652 | 210,348 | 65,000 | 275,348 | 76% | | | |
| 7/24/01 | 3:40 | 9,016,166 | 83,672 | 138,654 | 20,000 | 158,654 | 87% | | | |
| | | | | 1,444,790 | 1,070,000 | 2,514,790 | 57% | $5,788.64 | $2,860.68 | $4,305.47 | $12,954.80 |
| | | | | | | | | | | |
| 8/5/01 | 10:10 | 9,769,306 | 83,898 | 753,140 | 226,000 | 979,140 | 77% | | | |
| 8/7/01 | 9:45 | 9,883,174 | 83,937 | 113,868 | 39,000 | 152,868 | 74% | | | |
| 8/8/01 | 12:00 | 9,959,111 | 83,979 | 75,937 | 42,000 | 117,937 | 64% | | | |
| 8/9/01 | 2:00 | 10,041,052 | 84,003 | 81,941 | 24,000 | 105,941 | 77% | | | |
| 8/14/01 | 1:05 | 10,330,460 | 84,111 | 289,408 | 108,000 | 397,408 | 73% | | | |
| 8/15/01 | 3:15 | 10,419,590 | 84,137 | 89,130 | 26,000 | 115,130 | 77% | | | |
| 8/21/01 | 12:20 | 10,781,710 | 84,257 | 362,120 | 120,000 | 482,120 | 75% | | | |
| 8/25/01 | 10:55 | 11,072,800 | 84,349 | 291,0 | 92,000 | 383,090 | 76% | | | |
| 8/28/01 | 2:30 | 11,292,700 | 84,394 | 219,900 | 45,000 | 264,900 | 83% | | | |
| | | | | 2,276,534 | 722,000 | 2,998,534 | 76% | $6,902.15 | $4,507.54 | $6,784.07 | $18,193.76 |
| | | | | | | | | | | |
| 9/2/01 | 12:10 | 11,688,880 | 84,499 | 396,180 | 105,000 | 501,180 | 79% | | | |
| 9/5/01 | 5:00 | 11,862,520 | 84,543 | 173,640 | 44,000 | 217,640 | 80% | | | |
| 9/7/01 | 10:10 | 11,982,861 | 84,579 | 120,341 | 36,000 | 156,341 | 77% | | | |
| 9/13/01 | 11:00 | 12,380,850 | 84,698 | 397,989 | 119,000 | 516,989 | 77% | | | |
| 9/16/01 | 1:15 | 12,571,660 | 84,745 | 190,810 | 47,000 | 237,810 | 80% | | | |
| 9/20/01 | 9:00 | 12,865,110 | 84,822 | 293,450 | 77,000 | 370,450 | 79% | | | |
| 9/24/01 | 10:00 | 13,123,550 | 84,887 | 258,440 | 65,000 | 323,440 | 80% | | | |
| 10/1/01 | 1:30 | 13,548,240 | 85,026 | 424,690 | 139,000 | 563,690 | 75% | | | |
| | | | | 2,255,540 | 632,000 | 2,887,540 | 78% | $6,646.66 | $4,465.97 | $6,721.51 | $17,834.14 |
| | | | | | | | | | | |
| | | | | | | | | | | |
| | | TOTALS | | 12,804,030 | 4,246,900 | 17,050,930 | 75% | $42,205.42 | $25,351.98 | $38,156.01 | $105,713.41 |

US 6,846,407 B2

METHOD AND APPARATUS FOR RECOVERY OF WASTE WATER

CROSS-REFERENCE TO RELATED APPLICATION

This application claims benefit of copending U.S. provisional application No. 60/286,699, filed Apr. 26, 2001, entitled "HIGH PERCENTAGE RECOVERY LAUNDRY WASH WATER RECYCLE SYSTEM", the disclosure of which is incorporated in its entirety herein by reference.

FIELD OF THE INVENTION

The present invention relates to apparatus for wastewater recovery. More particularly, a preferred embodiment of the present invention provides an apparatus and method of recovering wastewater from laundry operations.

BACKGROUND OF THE INVENTION

Wastewater recovery from laundry operations has become a developed area of industry as water costs increase and the costs of municipality water treatment increases. The advantages of recovery of the wastewater from the laundering process are both economic and environmentally responsible. The user reduces the net demands on the valuable commodity of drinking water, reduces the requirements for sewer disposal, recovers the heat from the wastewater stream and can recover some of the chemicals used in the washing process. Indirect advantages can include decreased demand on equipment needed to provide water heating needs as well as water softening needs in laundry environments. This can extend the life of the equipment, reduce maintenance costs, and in situations where the operation is new, reduce the capacity needs of this equipment, reducing capital expenditures in this area.

In recent years, attention has been focused on methods to recover wastewater from industrial applications. Particular attention has been focused on the wastewater from commercial laundries. Typical commercial laundries use extremely high amounts of water to complete the laundering process. Other systems use methods to recover portions of the rinse water and reuse it for the wash cycle. Other art has focused on methods to capture all the wastewater from the washing machines and use a process of nano-filtration or reverse osmosis filtration to produce adequate water for reuse.

A deficiency of both of these systems is the net percentage of wastewater the processes can hope to recover. Through the recovery of the rinse water only, a system can recycle, at best, 25% of the total water used in the laundering process. In addition, this recovery method is not used for continuous batch style washers due to the fact that the rinse water is never released into the waste stream.

Likewise, a recycle process which employs nano-filtration, reverse osmosis or other type of membrane or ceramic filtration can not exceed about 60% total wastewater recovery due to the filters requirement of continuous flushing. In addition, these types of filtration process can cause additional problems for consumers who have restrictions on the wastewater quality imposed upon them by the local waste water treatment works and the Environmental Protection Agency. These types of filters generally send the flushing water to drain. In these filters concentrate the contaminants in the actual wastewater discharged to drain.

BACKGROUND OF THE PRIOR ART

While there are several companies promoting products or systems that recycle laundry wastewater, each has limits in its ability to recycle an optimum percentage of wastewater. Discussed below are several available types of systems that offer different products that provide a representation of products available in the marketplace.

Air Backflush Water Filtration System:

In conventional laundry environments, front-loading washing machines has three basic cycles—initial flush, wash, and rinse cycles. The initial flush pulls the large solids out of the laundry and discharges it. The wash cycle has injected chemicals such as bleach and detergent that, combined with hot water, break down the soiled garments and remove the majority of dirt and solids embedded in the laundry. After the wash cycle water is discharged to the drain, the final rinse cycle tends to be the cleanest wastewater, having minimal suspended solids and having a large concentration of chemicals.

The air backflush system takes in the final rinse water and filters it through a series of filter bag elements that accumulate the solids as the water is pushed through the system. A pressure differential gauge monitors the accumulation and as the pressure increases between the inlet and outlet of the water filter, the system automatically initiates an air-assisted backflush that pushes the solids through the top of the filter element and through a separate drain discharge.

This type of system is available from Kemco Systems. While the company claims water reductions of up to 50%, most systems of this type will be limited to about 30% or less water usage reductions. There are also some energy savings since this "water reuse" system will provide about 30% of new water at temperatures between about 80 and 90 degrees Fahrenheit. This represents an energy savings of about 15%.

Dissolved Air Flotation ("DAF") System:

DAF systems are commonly used in discharge environments where there are very high levels of suspended solids, oil and grease (FOG's), BOD's, and COD's. DAF systems function as follows: Discharge water is sent through a large solids filtration system. Filtered water is then sent to a large equalization tank (8 hrs of discharge). Because of the excessive volatility of the composition of the discharge water, large tanks with internal mixers help keep the water from having high volatility, which helps with the consistency of chemical injections. From the equalization tank, water is then pumped into the DAF Unit. Certain chemical polymers, flocculent, clay media, and other similar chemicals are injected into the process water to cause the solids to adhere and solidify, then coagulate and flocculate. Air is then injected into the process water causing the solids to rise to the top of the DAF unit. As the solids accumulate, a skimmer pushes the mud-like solids into a large holding tank. This sludge is then usually run through a filter press or de-watering unit until the solid is a black powdery material that is sent to a landfill.

DAF units are normally used as a pretreatment before discharging to sewer. However, these units are also sold as solutions to water recycling, as well. The DAF system suffers from several drawbacks. Because of the polymers and other chemicals injected into this process, there is a very high build-up of dissolved solids. This high TDS recycled water can only be reused in the wash cycle which represents about 33% reuse and there is very little energy savings. Also, there is a very high chemical cost as well as a very high equipment cost. Additionally, the DAF unit takes up a very large amount of space and can be labor intensive. This type of system is available from Kemco Systems.

Ceramic or Membrane Systems:

Ceramic or membrane system provide the cleanest and most potable water from recycling available in the marketplace. These systems, also referred to as Reverse Osmosis (R/O) systems, are usually added on to systems that already provide a proper pre-filtration or pre-treatment process. The R/O process requires process water to be filtered down to about 5 microns or less before beginning its filtration or the membrane can become fouled or clogged up quickly. The nano-filtration process uses high levels of pressure to push process water through the pores of very small openings in filter elements. The process removes the smallest levels of suspended solids as well as the majority of any dissolved solids in the water. This final "permeate" water is usually considered drinking water quality.

Reverse osmosis recycling, while very effective, is also expensive. R/O equipment by itself is very costly; however, this unit is attached to the end of the normal filtration process virtually doubling the final cost. Because of the need for very high levels of pressure, the energy cost to produce this high pressure provides an additional negative due to added operational costs. An additional disadvantage is that the RIO process, while removing the highest level of solids in the process water, loses about 30–50% of its water in the process. At a 60% recycle rate, high operational costs, large footprint, and very high equipment costs, this application is not necessary to recycle laundry wash water; this is a drinking water application only. This type of system is available from Kemco Systems.

Rinse Water Reuse:

The rinse water reuse system is very similar to other systems except that the rinse water reuse system only reuses selected cycles in the rinse process, providing an even less attractive recycle percentage. This system process utilizes a lint vibration system only, which will usually only provide a reduction in suspended solids to about 175 microns. The recycle percent averages about 25% and heat recovery about 10%. This type of system is available from Thermal Engineering of Arizona.

Heat Recovery or Reclamation System:

Heat recovery systems claim to recycle discharge water; however, the "reuse" process is short-lived. The process begins with a sump pump pulling discharge water from the collection pit and through a lint vibration or lint shaker system. Once the large solids are removed, the process water goes to a collection tank waiting for incoming water needs. As new city water coming through the heat exchange unit, it runs through small coils within the unit. The process water goes through the outside chamber and the preheated process water "heats" or transfers its heat to the new city water. While effective in reducing energy costs, most units do not transfer more than about 20–25 degrees Fahrenheit of heat. Cost benefit effectiveness is rather low due to high equipment costs and low energy savings. Discharge water is used to only heat hot water. Since this represents about 33% of total water, the system runs the city water through an additional time or two, each time increasing the temperature. Running the water through this many times can increase the reheat temperature up to 100 to 110 degrees Fahrenheit. However, there are added equipment costs to utilize this new process. While effective in reducing energy costs, there is no recycle process, so the only savings is in the energy. With high equipment and maintenance costs, the savings are difficult to justify except at an environmental standpoint. This type of system is available from Thermal Engineering of Arizona.

Ozone Laundry System:

Ozone, or activated air, is a form of oxygen created when an electrical charge is passed through the air. It functions as an oxidizer as well as a disinfectant. Ozone is used in many industries and is very effective for what it was developed for, i.e., a disinfectant. Ozone is used in laundry operations as a means to reduce or eliminate hot water use and to drastically reduce chemical usage. Injecting high doses of ozone into the wash cycle takes the place of hot water as a disinfectant and can reduce the chemical needs as well.

In addition, with less chemical needs there is less cycles and less water needed to wash clothes. These claims caused great excitement in the laundry industry in the late 1980's as companies were trying to save energy and reduce costs. However, in actuality, the process was ineffective as well as damaging to equipment. Without hot water, the garments were coming out of the washing machine gray and wrinkled. Without the chemicals needed, the garments continued to come out stained. And finally, over long periods of time (12–18 months) equipment such as piping and washer parts began to crack or become brittle from the high level of oxidation provided by ozone. The claims of 90% less hot water, 30% reduction in water and sewer costs, and 40% less chemicals were unfounded. Most of these systems are not sold currently—they are installed for free and the companies split the savings—a process very difficult to access and fairly inaccurate. This type of system is available from Enviro-Cleanse.

Laundry Recycle System:

Vehicle wash water recycling system takes laundry wastewater, passes it through a cyclone separator, a series of lint screens, oil absorption pillows, large open containers of river rock, and then through pressurized vessels of activated carbon and hydrocarbon before the water in considered recycled. It also uses ozone as a disinfectant. The system is designed to run by gravity requiring appreciably more equipment than pressurized systems. All products (other than pressure vessels) are open container causing a high susceptibility to bacteria and viruses in the water. Because there is no "backwashing" capabilities, the system is very labor intensive to keep equipment clean. While ozone can disinfect, it is injected only in limited locations, causing the remaining system to be completely exposed to infectious diseases and bacteria. In addition, there is limited suspended solids removal causing small lint particles to pass through the open rock beds and into the final water. This leaves the final recycled water looking cloudy and discolored. Finally, these units take up tremendous amounts of space and are extremely difficult and time consuming to install and maintain. This system is available from World-Wide Water Recycling.

U.S. Pat. No. 6,299,779B1, issued to Pattee, discloses a method for re-use of laundry wash water using a system of separators, filters and ozonation. The ozonation is carried out in pipes that connect various open tanks or beds. A problem with such a system, as well as several other systems discussed hereinabove, is that bacteria are not effectively removed. Open beds or tanks promote growth of bacteria, such as fecal coliform, part of human waste. These bacteria can also move into the closed, pressurized vessels and infect the activated carbon and hydrocarbon tanks. It has become an increasingly prominent concern of commercial laundry facilities to remove bacteria effectively to assure the user or wearer of the laundered item of a clean garment or article.

It would be desirable to have a wash water recycling system that addresses the deficiencies in the prior art and provides an efficient recycling system that provides recycled water sufficiently clean to be reused in the wash facility. Such a system would preferably have closed filtration vessels to reduce bacteria growth as well as an effective disinfectant system to remove bacteria present in the wash water entering the recycle system. In addition, while ozone is a good disinfectant, there are certain small viruses that can escape ozone disinfection. Differing variations of radiation at the conclusion of the recycle process provide a final step to complete disinfection as well as a means to neutralize any remaining ozone from escaping the recycle system and possible transfer to washing equipment.

SUMMARY OF THE INVENTION

Generally described, the present invention provides in a preferred embodiment a system which transfers waste wash water from laundry machines to a trough. The wash water is then pumped to a process tank. This water is subjected to ozone which removes odor and controls bacterial growth. The ozone also coagulates suspended matter, causing it to float. Optionally, a polymer coagulant can be added to facilitate coagulation. From the process tank, lint and other large particles are removed by a lint pulloff filter assembly, which can be a series of pressurized filter bags, a spin disk assembly, or other lint pulloff if assembly. The output water of this lint pulloff filter assembly flows to a multimedia pressure filter. The media is a gradient of layers of progressively smaller granular or particulate matter which removes suspended solids. The filtrate is passed to a clay filter which removes fats, oils, greases and other organic and chemical components. The filtrate from the clay filter is passed to a carbon filter (granular activated carbon) which removes remaining organic matter and chemicals.

The water output from the activated carbon filter is passed to a final holding tank which also receives ozone, keeping the process water germ free as its waits for additional water needs. When demand is present, the system sends processed water through ultraviolet (or other energy similarly used) light to disinfect the water and to degrade the ozone so that it does not harm any components of the system or the washing machines and to minimize ozone released into the atmosphere.

The system also can include a PLC controller and associated computer system for controlling pump rates, tank levels, filter parameters, backwashing scheduling, provide critical operational data, and other aspects of the system. Advantages of the present system include high recovery efficiency, improved bacterial growth control, and high return on investment. An additional advantage is the environmental benefits. We are quickly using up our limited natural resources, especially water. A recycling system that maximizes water recovery is a key element to water preservation. The present invention reduces the natural gas needs to heat the water. Furthermore, the substantial reduction in wastewater discharge eases the burden of water treatment and purification facilities to expand and accommodate the ongoing demand for services. The water recovery and recycle system of the present invention can also be used or adapted for use with other wash applications, such as boats and car wash systems.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which:

FIGS. 5A–5C are a chart of data from product run test.

DETAILED DESCRIPTION OF THE PREFERRED EMBODIMENTS

In general, the present invention provides a wastewater recovery and recycling apparatus. The present invention can be used for recycling of wastewater from various applications, the variations of which will be discussed further hereinbelow. For the purposes of discussion of the preferred embodiments, the apparatus will be discussed in reference to a laundry operation environment, but it is to be understood by those skilled in the art as including other operations and applications.

Figure 1:
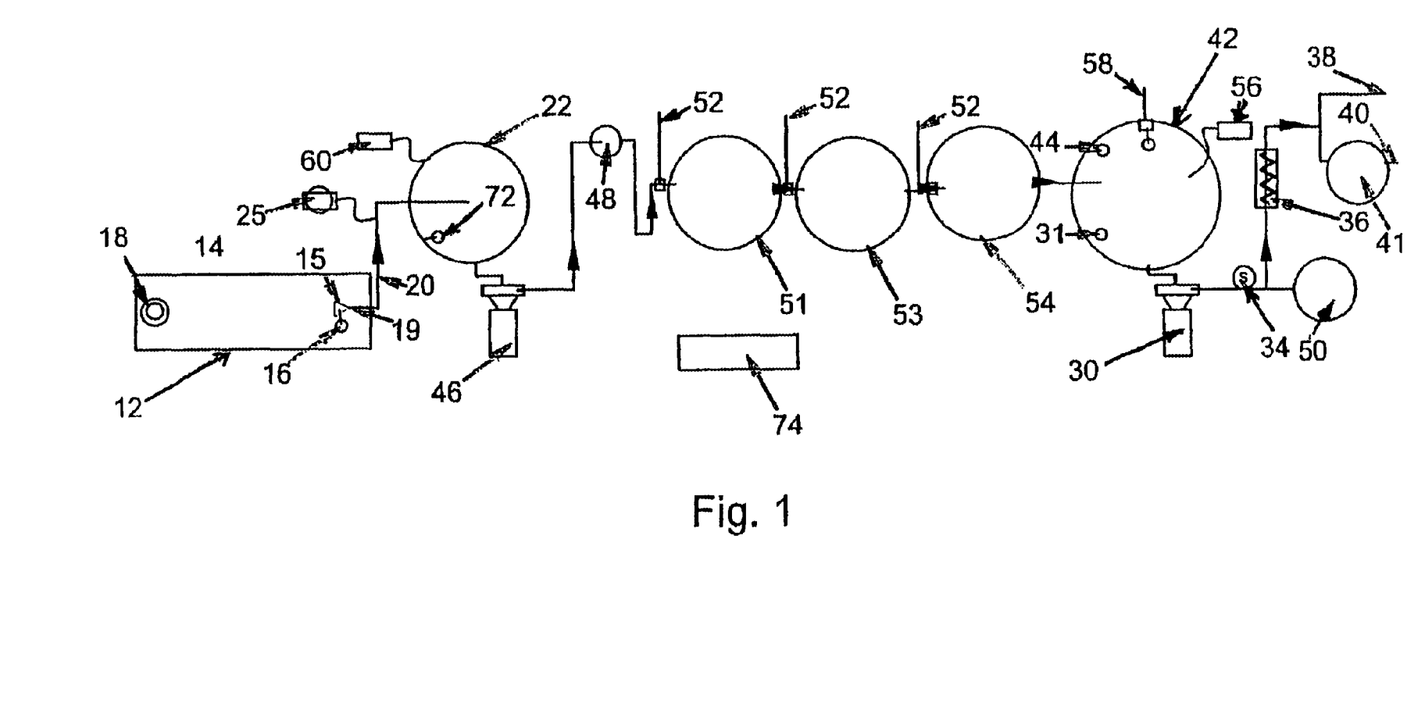
FIG. 1 is a schematic view of a preferred embodiment of the present invention.

FIG. 1 shows an apparatus 5 according to a preferred embodiment of the present invention in which at least one and preferably a plurality of conventional washing machines 10 (not shown) output waste water to a trough (or collection pit) 12. The trough 12 has a float 16 associated with a pump 19 which pumps water from the trough 12 via a conduit 20 to a process tank 22, which is sized to accommodate the total output load of the washing machines 10. For the purposes of the present invention, unless specifically described otherwise, the conduit referred to is preferably made of an inert, nonbiodegradable, material, such as, but not limited to, polyvinylchloride (PVC), other polymer, or metal. As such conduit is known to those skilled in the art, it may at times not be shown in the figures, but is intended to be used to convey fluid from one location to another in a watertight structure.

Normally, wastewater (process water) from a laundry operation is discharged into an initial collection area (trough or pit). Temperatures can average from 100 degrees Fahrenheit up to about 140 degrees Fahrenheit and all equipment must be designed to handle these high temperatures, if necessary. Fresh water comes in at about 60 degrees Fahrenheit. The present invention can reclaim water from about 33–210 degrees Fahrenheit.

The size of the system is determined by the company's washing machine load capacity. This determines their peak water flow. It is calculated by adding the pounds capacity per machine and multiplying it by the average amount of water used by the washing machines per pound of dry laundry. One then divides that number by the number of minutes between loads. For example, 3–300 lb washers represent 2,250 gls per washing cycle. With a 45 minute cycle, the system's peak water flow is 50 GPM and a 50 GPM system would be recommended.

Supply Flow

A supply pump 30 pumps water from a final holding tank 42 to the washing machines 10. A float safety switch 31 is included in the holding tank 42 so that the supply pump 30 does not run dry. When the float safety switch 31 lowers to below a predefined level, a signal is actuated which turns off the supply pump 30. A fresh water inlet 58 in the middle of the holding tank 42 provides a safety valve in case the water demands of the washing machines 10 is greater than the process water available. It also provides make up water from evaporation or to replenish lost process water from backwashing procedures. There is a mechanical float valve or float switch/solenoid valve assembly 59 attached to the fresh water inlet 58, physically closing the inlet when the water level exceeds the inlet line. The fresh water supply should be designed with a pipe size as well as enough pressure to provide enough water if system has malfunctioned and cannot provide sufficient process water. A preferable design provides that the only time the supply pump 30 is deactivated due to low level in the holding tank 42 is if fresh water supply has dissipated. A pre-charge pressure tank 32, located after the supply pump 30, has an internal bladder (not shown) that fills with water and is designed to provide immediate water needs to the washing machines 10 upon demand while the supply pump 30 is turning on and beginning its function of water supply to the washing machines 10. This pre-charge tank 32 has a switch 34 to turn the supply pump 30 on and off in response to, in part, the signal from the float safety switch 31. If water usage is intermittent, preferably the pump 30 and switch 32 are actively used to reduce the occurrence of the low water levels; however, if water use is constant, the supply pump 30 can be left on continuously. Water is passed through an ultraviolet light source 36, or other similar disinfecting electromagnetic radiation source (e.g., beta, gamma, X-ray radiation, or the like) known to those of ordinary skill in the art, which kills a substantial percentage of likely water-borne organisms, specifically bacterial and viral in nature. The ultraviolet light source 36 is commercially available from Aquionics, Louisville, Ky. The ultraviolet (or other energy similarly used) light also degrades the ozone so that it does not harm any components of the system or the washing machines and to minimize ozone released into the atmosphere.

Water passing through the filter 36 is divided into two flows by a splitter (not shown). A portion (for example, but not limited to, a roughly equal split) of the water goes back via a conduit 38 as cold or tempered water to the washing machines 10. The other portion of water goes back via a conduit 40 as hot water to the washing machine (if steam injected), a hot water heater 41, or whatever heating source designed for that particularly environment.

As the water level in a final holding tank 42 drops, a fill float switch 44 is actuated and turns on the process system (as described in detail hereinbelow) which turns on a process pump 46, which sends water from the process tank 22 as long as there is sufficient water in the process tank 22.

Process Tank

Waste water from the trough 12 is sent to the process tank 22 whenever the float switch 16 indicates that sufficient water is present. Ozone from an ozone generator 60 (as discussed further hereinbelow) is added to the process tank 22 to keep it germ and odor free and help coagulation. The process tank 22 is sized according to the calculations presented previously.

Lint Filtration

There are several alternative types of lint pulloff assemblies that can be used. One assembly, used for small systems uses a series of pressurized filter bag units 47, available from a variety of sources such as Hayward Industrial Plastics, Clemmons, N.C. These units use internal non-woven polypropylene bags to catch large solids. The micron level in each bag varies, depending on turbidity of process water. An alternative second assembly, used for larger laundry environments can use, for example, but not by way of limitation, a shaker table or vibratory filter, which can remove suspended solids down to manageable levels. Another lint pull-off assembly is a spin disk 48, with stackable disks 49 (not shown) with grooves of differing micron size levels. As process water travels around these disks 49, a vertical arm which holds the disks sucks the process water through small holes in the arm, trapping suspended solids, such as lint, between and around these disks. As pressure rises, the spin disk provides an air assisted flush which causes the disks to separate and the suspended solids are discharged to sewer as backwash. This product, manufactured by Arkal Filtration Systems of Jordan Valley, Israel, is distributed commercially in the United States by A2 Water, of Gregory, Tex.

Multimedia Pressure Filtration

After lint filtration the process water is transported via a conduit (not shown) to at least one pressure tank 50 containing a multimedia pressure filter 51. These pressure tanks 50 are preferably made of wound fiberglass and are light weight and long lasting or of epoxy coated steel, which are long lasting as well. It is to be understood that other materials can be used as are known to those skilled in the art. They are flanged at the top and bottom with a distributor head diffuser on the top and distributor arms at the bottom. The tanks 50 are filled with different types of earth media, each sized specifically to capture suspended solids of the same size. In a preferred embodiment anthracite is used first because it is light weight and coarse. It catches the largest solids. It is layered down to sand, then garnet, and then gravel is preferably used as the bottom base to secure and hold down the bottom distributor arms for backwashing. It is to be understood that other particulate matter can be used, as is know to those skilled in the art.

Process water is sent at a pressurized state through the top opening and out the bottom opening. This is called the filtering mode. As process water continues to flow through these filters, the suspended solids continue to be "held" by the media inside. Each tank 50 can have a pressure differential gauge (not shown) which monitors high solids buildup when process water shows signs of high turbidity. The more solids that are accumulated, the higher the pressure differential gets. When the pressure differential exceeds the system limits, the system automatically shuts down and goes into backwash mode. There are also total flow limits (normal process) to limit the total water recycled between backwashes and timing limits, such as every night at midnight to insure regular backwashing regardless of volume. In a preferred embodiment, a flow limit is between backwashes. When performing a backwash, process, fresh, or a combination of both types of water is sent up from the bottom of the tank 50 with enough force to cause the media bed to lift up about 50% (although the actual percentage can vary). This action causes the trapped solids to separate from the media bed and are then pushed up and out of the top of the tank 50 and down the discharge pipe (not shown) to the sewer 51. Each pressure vessel has a flanged opening at the top and bottom that are piped in two directions, one for water filtration and the other for backwashing purposes. Each "pipe" is controlled by a pneumatically actuated valve 52 or both pipes at the top or bottom can be controller by a three way pneumatic valve, which opens and closes depending on which mode the system is in, i.e., filter mode or backwash mode.

Clay Filter

The output of the process water from the multimedia pressure filter 50 then goes to another pressure filter called a clay filter 53, which adsorbs fats, oils, grease, organics, heavy metals and chemicals, such as, but not limited to, dyes, surfactants, oils, grease and the like. The clay filter is composed of a combination of anthracite and organically modified "designer clay" and is purchased from Biomin under the trade name Organo-Clay™. The clay filter extends the life of the carbon media and increases the capacity of both carbon and clay to adsorb higher levels of FOG's as well as organics in the process water. The volume of clay needed, the retention time necessary to be effective and the backwashing sequence of the clay filter is the same as the carbon filter below.

Carbon Filter

The output of the process water from the from the clay filter then goes to another pressure filter called a carbon filter 54, which removes any remaining organic matter and chemicals, such as, but not limited to, dyes, surfactants, oils, grease remaining after the clay filter. The carbon filter 54 also helps remove odors in the process water. The carbon filter 54 is preferably granulated activated carbon. The carbon filter 54 and the clay filter 53 adsorbs these items while the filtration of suspended solids through the multimedia process traps, holds, and later releases those solids to sewer discharge. Backwashing only helps regenerate the media; there are solids or chemicals removed in the backwashing process. The carbon filter 54 is backwashed to "fluff up" and redistribute the carbon and clay beds so that process water can "find" and absorb clean carbon and clay while traveling though the filter material.

The output of the process water from the carbon filter 54 is transferred to the final holding tank 42. An ozone generator 56 provides ozone bubbles, which are passed through the water in the holding tank 42 to help remove odor and to control bacterial growth. The ozone generator 56 can be a corona discharge type or an ultraviolet (UV) light frequency, which creates a low ozone volume concentration. One such generator is available from Prozone, Huntsville, Ala. If there is insufficient water to fill the holding tank 42, a fresh water inlet 58 is opened to allow water to enter the holding tank 42.

An ozone generator 60 generates ozone which is injected in process tank 22 and the holding tank 42. The ozone is a microcoagulant and binds to particles, causing them to coagulate and float facilitating filtration by the multimedia filter. Optionally, a polymer coagulant can be added to assist in coagulation if there are sufficient fats, oils, and/or grease present in the water, such as where the clothes are soiled with grease or oil. The polymer is preferably a cationic polymer. A preferred polymer coagulant is available as Zeta™ series from CIBA Specialty Chemicals (Suffolk, Va.).

Figure 2:
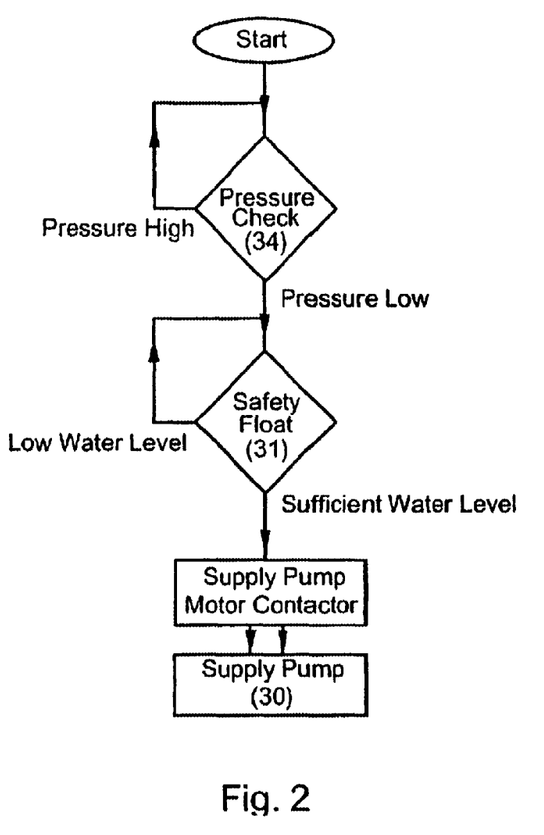
FIG. 2 is a flow diagram of a portion of the system relating to the supply pump.
Figure 3:
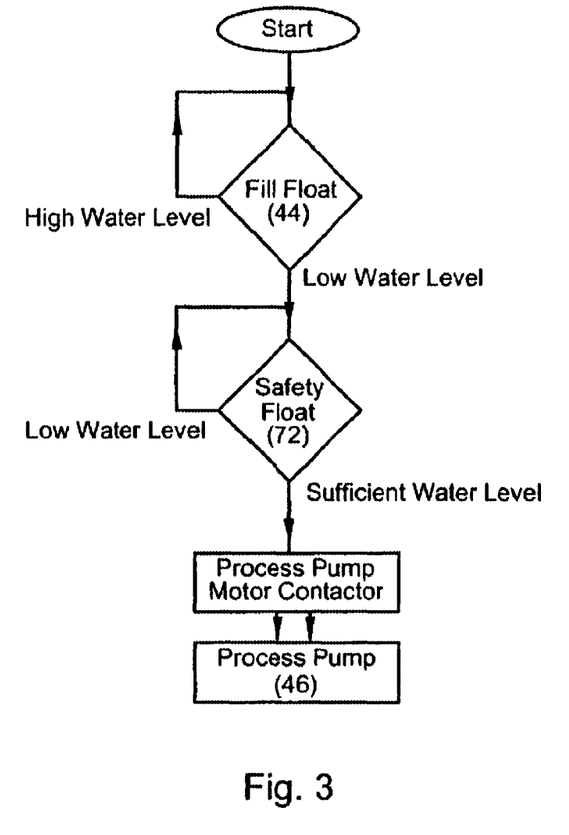
FIG. 3 is a flow diagram of a portion of the system relating to the process pump.
Figure 4:
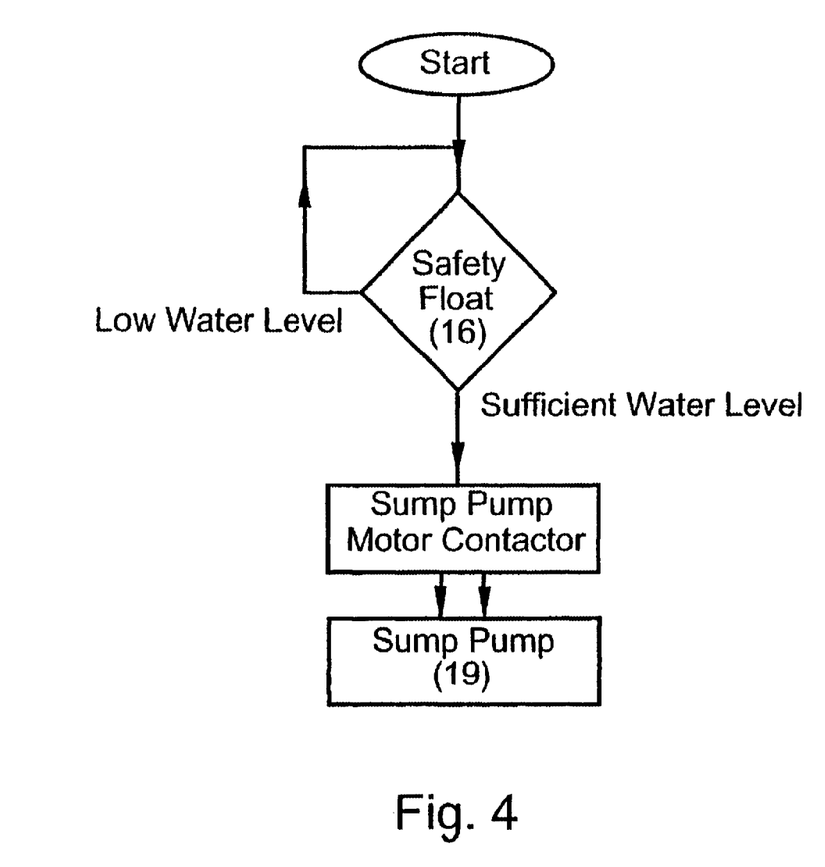
FIG. 4 is a flow diagram of a portion of the system relating to the sump pump.

FIGS. 2–4 show the electrical control activation flow systems of the present invention.

Supply Side Series

FIG. 2 is a flow diagram of the supply pump 30 process, which is controlled by the operating pressure of the water going into the washing machines 10. The pressure switch 34 monitors water needs of the washing machines 10 by pressure. When the pressure goes up, water needs have diminished and the signal through the safety float 31 in the holding tank 42 is terminated which causes the supply pump 30 to turn off. If pressure goes down and there is sufficient water in the final holding tank 42, the pressure switch closes and the signal travels to the safety float switch 44. If the safety float switch indicates sufficient water available, then signal continues to a supply contactor relay 70 in a central control panel 74, which maintains the pump 30 is activated and the supply pump turns on.

Process Series

FIG. 3 is a flow diagram of the process pump process. There is a fill float 44 in the final holding tank 42. A signal from the central control panel 74 goes through the fill float 44. If the final holding tank 42 is full, the signal does not continue. When the level begins to go down, the signal continues and the process pump turns on. If the level of water in the process tank 22 is high, that signal will carry on to the process pump contactor 76 and the process pump 46 turns on. If the water level in the process tank 22 is low, that signal does not continue and the process pump is deactivated.

Waste Pump Series

If water is detected by the float switch 16 in the trough 12, a signal is sent to the sump pump motor contactor 78. The sump pump 19 is activated and water is pumped to the process tank 22. When the discharge level in the trough 12 gets low, the sump pump 19 turns off to insure that the sump pump 19 does not run dry. If the process tank 22 runs to a high level, the fill float causes the signal to not continue, causing the sump pump 19 to turn off. Excess wastewater then overflows to the drain.

Control Panel

A PLC (program logic controller) control panel 72 automates the backwashing process providing power to all components as well as handling all signals from float switches. It may include a touch screen for easy operation feature as well as a computer system that makes it very easy to change timer settings and other functions of the system. The control panel 72 may also show the flowrate, total flow and/or other parameters, if desired. A remote access port, when connected to a telephone line, can provide valuable operational data from the flow meters. This data assists in monitoring the performance of the system as well as management data to document savings. This option increases the service level the company can provide to its customer, regardless of the location of the system.

Advantages

The present invention is advantageous because it addresses the particular waste stream of laundry. The majority of water contaminate is lint, which is addressed by the present system design. Lint acts as a magnet and clogs up surfaces in which is in contact. The pump of the present invention system is selected to have no sharp edges and a port size large enough to continually pass and so that it cannot be normally clogged and that any large enough lumps of lint are dislodged by the water pressure. Sources for such a pump include, but are not limited to, Gorman Rupp (Mansfield, Ohio) and Goulds (Seneca Falls, N.Y.). It is also important that the pump seal be chemically resistant, since acids and other harsh chemicals could damage a normal seal.

The filter scheme preferably uses ozone as a microcoagulant and optionally a coagulating polymer. The spin disks, filter bag units, or shaker table units address the lint issue by efficient removal. Such filtration is not obvious in view of the prior art systems. The lint removal filters also reduce backwashing of the multimedia filter bed. Both the filter bag system and the lint shaker apparatus are preferable in that each will physically insolate and accumulate these solids to a external source to be disposed of outside the sewer system. The present invention limits the volume of solids sent to sewer systems, thus being environmentally desirable.

An important aspect of novelty of the present invention is the nonobvious combination and configuration of filtration assemblies in the system to remove lint, organic and inorganic matter. The present invention reduces the amount and frequency of backwashing needed to maintain the filtration assemblies in good condition. Such reduction of backwashing reduces the amount of water lost and increases the efficiency of the system. In one installation of the present invention approximately 85% water recovery was obtained. It should be noted that approximately 10–15% of the system water is lost due to evaporation by the clothes dryers.

Additionally, the filters work co-operatively in concert: the ozone coagulates material and the multimedia, clay, and carbon pressure vessels remove or adsorb the coagulated material. Without coagulation the filtration process might not be able to remove sufficiently the solids or FOG's.

The water recovered by the present invention is sufficiently clean as to be used again in the washing machine without contaminating the clothes. Other prior art systems produce water which would be less clean and residual contaminants can get trapped in the clothes. Other systems which use reverse osmosis remove dissolved solids (ions), require a continual backflush. Therefore, one could expect a reverse osmosis system to have about a 50% maximum total water recovery. In contrast, the present invention dilutes total dissolved solids present in process water by using process water at strategic times as backwash water to the filters as well as providing fresh water as makeup water when the system is in backwash, effectively reducing TDS by dilution For example, in a laundry operation recycling 60,000 gallons per day, one could utilize approximately 3–5% of the daily process water to backwash the filters as well as an additional 10–15% fresh water to replace lost water to evaporation or when system is in backwash and not providing recycled water. One goal is to maintain a TDS level of between 500–1000 ppm in the final process water at any time. The example which follow provide sample results before and after recycle system. While other prior art systems are rinse water recovery systems, the present invention is a total wash water recovery system. The waste water recovery system of the present invention has at least about 75% total wash water recovery using a volume ratio of process water returned as recycled water to the typical amount of freshwater used without recycling.

Another advantage of the present invention are the low operating costs, which result in higher return on investment. Additionally, the process provides a environmentally effective means to clean clothes while reducing our need for limited natural resources.

Other Applications

The apparatus of the present invention can also be used or adapted for use in other applications and for other recovery operations. For example, the present invention can be adapted for use in conjunction with boat cleaning systems. Boat cleaners produce paint chips in the waste water, which can be toxic. The ozone can coagulate oil and grease and the spin disk or filter bag units will trap and remove paint chips. In such a system the polymer coagulant may be omitted. A high pressure pump could be used as the supply pump 30 to provide the high wash pressure of about 1,000–1,500 psi commonly needed in such systems. For such a system the ultraviolet filter could optionally be omitted. The present invention can also be adapted for use in vehicle or other wash systems.

The invention will be further described in connection with the following examples, which are set forth for purposes of illustration only. Parts and percentages appearing in such examples are by weight unless otherwise stipulated.

EXAMPLES

Figure 5C:
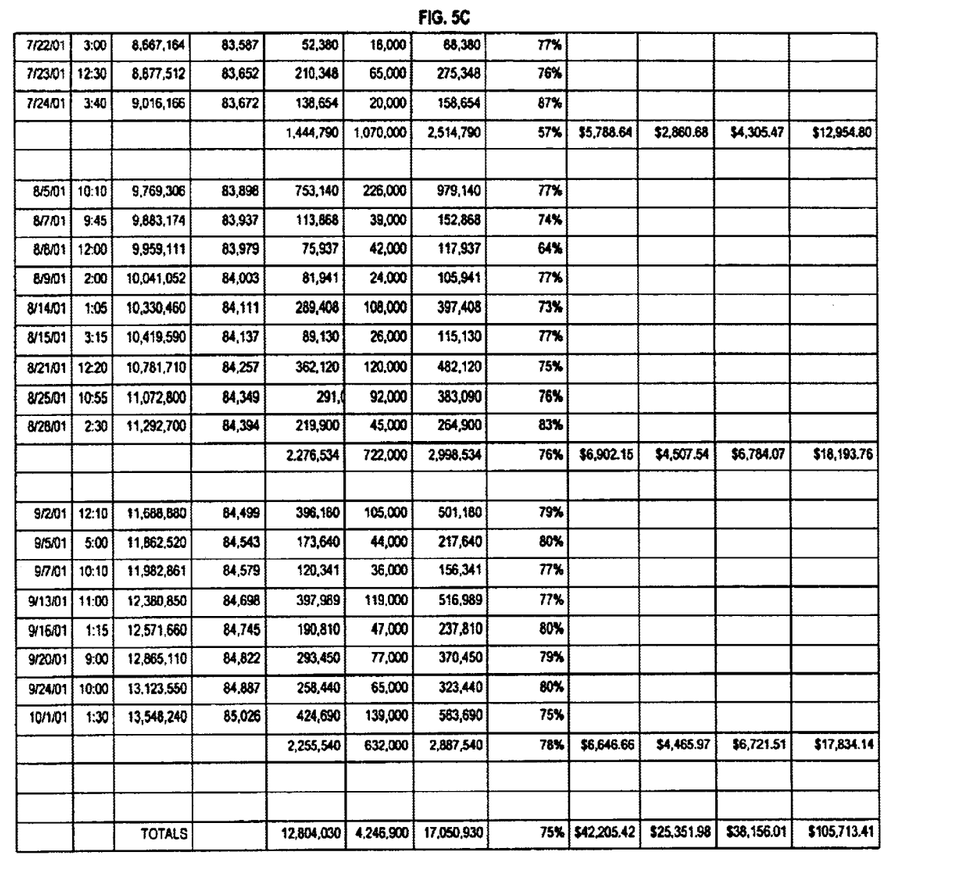

The EMI™ model 175 GPM system was first installed in February of 2001 and was up and running effectively March 1. As of Oct. 1, 2001, the system has recycled 13.5 million gallons of water and saved the owner over $100,000 in water, sewer, and energy savings. During the seven months of operation, it recycled 75% of the owner's laundry wastewater. FIGS. 5A–5C shows data of the recycle process and savings over a period of seven months.

Laboratory analysis of the wash water, taken Oct. 2, 2001, showed the results as shown in Table 1. Numbers are in mg/L; standard published analytical methods are used; and, "J" is estimated concentration. Sample #1 represents the waste water and Sample #2 represents the recovered product water from the EMI175 system of the present invention.

TABLE 1

| Analytical Method | Analyte | Draft Result Sample #1 (mg/L) | Draft Result Sample #2 (mg/L) | Detection Limit Sample #1 (mg/L) | Detection Limit Sample #2 (mg/L) |
|---|---|---|---|---|---|
| SM 5210 B | Biochemical Oxygen Demand ($BOD_5$) | 177 | 123 | 8 | 8 |
| EPA 160.2 | Total Suspended Solids | 34 | 9 | 6 | 5 |
| EPA 160.1 | Total Dissolved Solids | 678 | 576 | 12 | 12 |
| EPA 150.1 | pH (laboratory) | 9.08 | 7.5 | — | — |
| EPA 1664 | Oil and Grease | 20 | 7 | 6 | 6 |
| SM9222 D | Fecal Coliform | 64000 per 100 ml | 34 per 100 ml | 2 | 2 |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

What is claimed is:

1. A single pass water recycle and recovery system, comprising:
   a. a container for receiving waste water;
   b. at least one tank;
   c. means for filtering lint and other similar size particles;
   d. a multimedia pressure filter comprising at least one tank, each tank containing a plurality of cart media, each media being sized to filter suspended solids of a particular size range;
   e. a clay filter;
   f. an activated carbon filter;
   g. means for coagulating particles comprising  i. means for generating ozone and means for contacting said ozone with said water, and
 ii. a cationic polymer coagulant;
h. a means for generating ultraviolet light for disinfecting said waste water;
i. at least one pump for pumping water from said at least one tank through said filters; and,
j. a controller in electrical communication with said at least one pump.

2. The apparatus of claim 1, wherein said lint filtering comprises at least one pressurized filter bag.

3. The apparatus of claim 1, wherein said lint filtering means comprises at least one vibrating filter screen.

4. The apparatus of claim 1, wherein said lint filtering means comprises at least one spinning disk having a plurality of grooves defined thereon.

5. The apparatus of claim 1, said apparatus having at least 75% total wash water recovery system using a ratio of recycle water produced and reused to laundries normal freshwater usage without recycling.

6. A process for recycling waste water, comprising:
 a. providing a container for receiving waste water;
 b. contacting said waste water with a means for filtering lint and other similar size particles;
 c. contacting said water of step (b) with a multimedia pressure filter comprising at least one tank, each tank containing a plurality of earth media, each media being sized to filter suspended solids of a particular size range;
 d. contacting said water of step (c) with an activated carbon filter,
 e. contacting said water of step (d) with a means for coagulating particles wherein said coagulating means comprises a polymer coagulant; and,
 f. contacting said water with a means for disinfecting said water.

7. The process of claim 6, wherein said coagulating means comprises a combination of a polymer coagulant and ozone.

8. The process of claim 7, wherein said polymer is a cationic polymer.

9. A single pass water recycle and recovery system, comprising:
 a. a container for receiving waste water
 b. at least one tank;
 c. means for filtering lint and/or other similar size particles;
 d. a multimedia pressure filter comprising at least one tank, each tank containing a plurality of earth media, each media being sized to filter suspended solids of a particular size range;
 e. an activated carbon filter;
 f. a polymer coagulant for coagulating particles;
 g. means for disinfecting said waste water;
 h. at least one pump for pumping water from said at least one tank through said filters; and,
 i. a controller in electrical communication with said at least one pump.

10. A single pass water recycle and recovery system, comprising:
 a. a container for receiving waste water;
 b. at least one tank;
 c. means for filtering lint and/or other similar size particles;
 d. a multimedia pressure filter comprising at least one tank, each tank containing a plurality of earth media, each media being sized to filter suspended solids of a particular size range;
 e. an activated carbon filter;
 f. a combination of polymer coagulant and ozone for coagulating particles;
 g. means for disinfecting said waste water;
 h. at least one pump for pumping water from said at least one tank through said filters; and,
 i. a controller in electrical communication with said at least one pump.

11. A single pass water recovery and recovery system, comprising:
 a. a container for receiving waste water;
 b. at least one tank;
 c. means for filtering lint and/or other similar size particles;
 e. a multimedia pressure filter comprising at least one tank, each tank containing a plurality of earth media, each media being sized to filter suspended solids of a particular size range;
 f. an activated carbon filter;
 g. a cationic polymer for coagulating particles;
 h. means for disinfecting said waste water;
 i. at least one pump for pumping water from said at least one tank through said filters; and,
 j. a controller in electrical communication with said at least one pump.

12. An apparatus for single pass recycling of waste water, comprising:
 a. a container for receiving waste water;
 b. a means for filtering lint and/or other similar size particles;
 c. a multimedia pressure filter comprising at least one tank, each tank containing a plurality of earth media, each media being sized to filter suspended solids of a particular size range;
 d. an activated carbon filter;
 e. a means for coagulating particles wherein said coagulating means comprises a combination of a polymer coagulant and ozone; and,
 f. a means for disinfecting said water whereby waste water passing through or in contact with at least one of said elements b–f is cleaned.

\* \* \* \* \*